United States Patent [19]
Pierce et al.

[11] 3,978,430
[45] Aug. 31, 1976

[54] SEGMENTED FLOW LASER CAVITY

[75] Inventors: Russell W. Pierce, Ridgecrest; Fred T. Rogers, China Lake, both of Calif.

[73] Assignee: The United States of America as represented by the Secretary of the Navy, Washington, D.C.

[22] Filed: Oct. 2, 1975

[21] Appl. No.: 619,135

[52] U.S. Cl. .......................... 331/94.5 D; 330/4.3; 331/94.5 G
[51] Int. Cl.² ........................................ H01S 3/07
[58] Field of Search ..................... 331/94.5; 330/4.3

[56] References Cited
UNITED STATES PATENTS

| | | | |
|---|---|---|---|
| 3,501,714 | 3/1970 | Myers et al. | 331/94.5 D |
| 3,599,107 | 8/1971 | Knudson et al. | 331/94.5 D |
| 3,619,810 | 11/1971 | Mefferd | 331/94.5 D |
| 3,670,257 | 6/1972 | McMahon | 331/94.5 D |

*Primary Examiner*—William L. Sikes
*Attorney, Agent, or Firm*—R. S. Sciascia; Roy Miller; Gerald F. Baker

[57] ABSTRACT

A gas laser is constructed of discrete segments in such a manner that the gas flowing through the active region of the laser is introduced from a plenum chamber from whence it flows annularly into the active region and travels through the region both to the left and right of the input until it reaches the first output region. From there the gas flows annularly out into a shaping region and thence into the output plenum.

1 Claim, 3 Drawing Figures

SEGMENTED FLOW LASER CAVITY

BACKGROUND OF THE INVENTION

The performance of carbon dioxide lasers, for example, can be greatly improved by flowing the gas through the active region in a manner which does not require large blower equipment or methods to stabilize the plasma. Flowing the gas through the active region of a carbon dioxide laser improves the laser's performance in two ways. First, the gas heating problem can be overcome if the gas flow transit time is much shorter than the characteristic times for diffusion of heat through the cavity walls. The excess heat formed from the discharge by the gas is swept away to a more efficient heat exchanger. Second, new gas is continually being passed into the active laser region.

A major problem, however, with flowing the gas through the active region is the problem of producing a high enough flow rate with a small lightweight blower. The critical parameter is the time that a particular volume of gas stays in the active region.

Flowing the gas through the active region has proven to be unacceptable because the gas flow pushes the plasma downstream. Attempts to align the plasma with magnets have also been generally unsuccessful.

SUMMARY

Accomplishment of this objective has been facilitated by the design of modular segments which may be combined in pairs to form an active region of a gas laser of any length which is a multiple of two such segments.

According to the present invention, by making the active path length through which the gas travels as short as possible, the flow velocity and the blower requirements, therefore, have been reduced.

DESCRIPTION AND OPERATION

Figure 1:
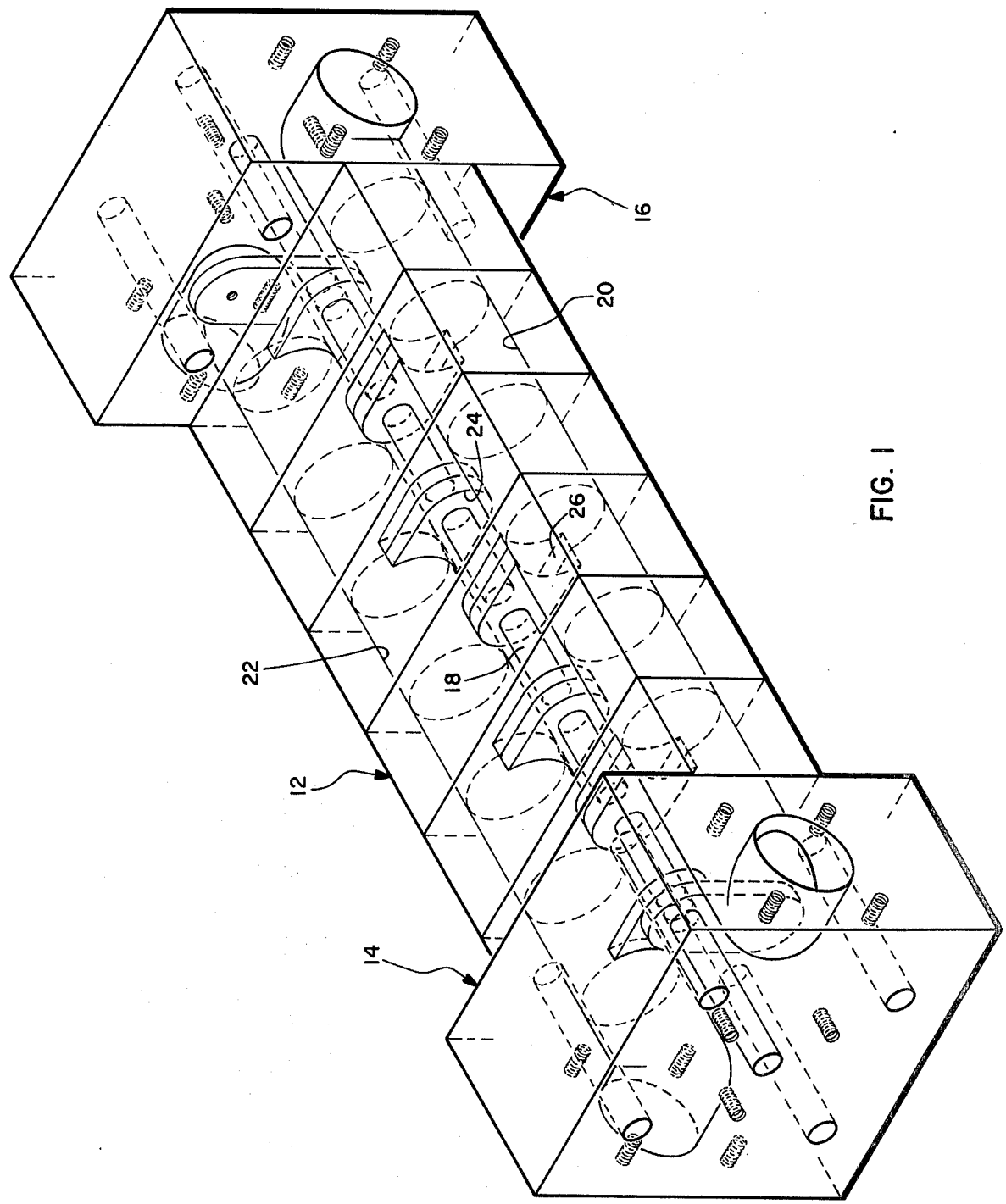
FIG. 1 is an isometric view of a laser manufactured according to the present invention.

The laser 10 shown in FIG. 1 is made up of a plurality of segments 12 and a pair of end pieces 14, 16.

Figure 2:
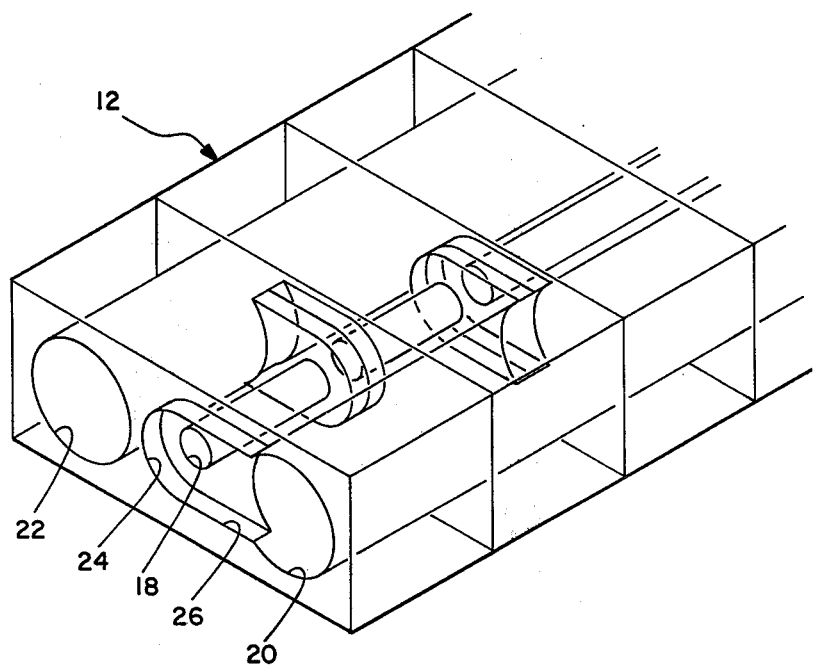
FIG. 2 is an enlarged partial isometric view showing the arrangement of segments in the device of FIG. 1.

The character of the segments and the arrangement thereof in the laser are more clearly shown in FIG. 2. Each of the segments 12 is identical, having a central bore 18 and two larger peripheral bores 20, 22. Two sides of each segment are counterbored at 24 around the axis of central bore 18 and relieved tangentially from a diameter of said counterbore as shown at 26 to produce a communicating passageway between central bore 18 and the corresponding peripheral bore.

When the segments are placed together, the relieved portion 26 of one segment will be complimentary to the relieved portion of another segment or a similar relieved portion on an end piece such as 14, for example, providing a closed passageway connecting central bore 18 with one of the peripheral bores 20, 22.

Figure 3:
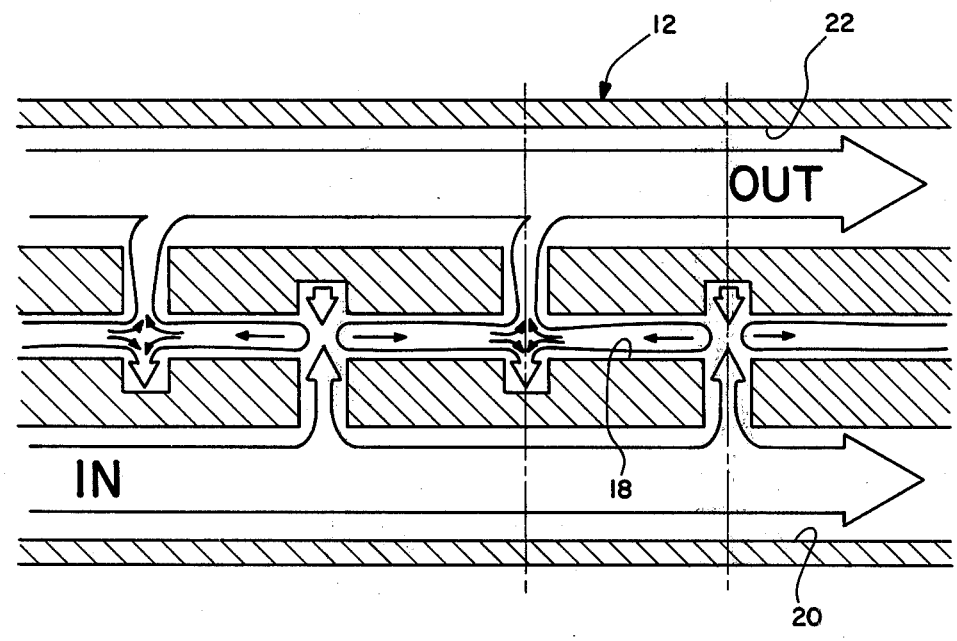
FIG. 3 is a schematic of the gas flow in the device of FIG. 1.

As shown in FIG. 3, when gas is introduced in one of the peripheral passageways, for example 20, gas will flow from that passageway into each of the connecting passageways and will flow both ways therefrom along the central bore 18 which is on the optical axis of the laser.

Gas flowing from each of the introductory passageways meet at an exit passageway leading to the opposite peripheral bore 22 from whence it is led out of the system to be exhausted or recycled.

Using the modular segments according to the present invention the length of the active region may be made any length which is a multiple of two of the segments. Gas flow distance through the active region is minimized and the plasma is practically unaffected.

The simplicity of the design of the segments is important when hard to machine material such as berylium oxide, for example are used.

What is claimed is:

1. An article of manufacture for use in the active region of a gas laser comprising:
   a plurality of identical segments;
   each segment comprising a generally rectangular solid having at least two planar parallel sides, a bore centrally located in said solid having an axis orthogonal to said parallel sides, two further bores in said solid equally spaced from said central bore and having axes parallel thereto, a counterbore in the face of each parallel side along the axis of said central bore, each said parallel side being relieved between said counterbore and respective ones of said further bores so that when two said modular segments are combined with the axes of the respective bores in coincidence, a closed communicating passageway is formed between said central bore and one of said further bores.

* * * * *